(12) United States Patent
Rose et al.

(10) Patent No.: US 6,228,263 B1
(45) Date of Patent: May 8, 2001

(54) TREATMENT OF SULPHATE- AND METAL-CONTAINING WATER

(75) Inventors: Peter Dale Rose; Oliver O'Connor Hart, both of Grahamstown (ZA)

(73) Assignee: Water Research Commission, Pretoria (ZA)

( * ) Notice: Subject to any disclaimer, the term of this patent is extended or adjusted under 35 U.S.C. 154(b) by 0 days.

(21) Appl. No.: 09/418,326

(22) Filed: Oct. 14, 1999

(30) Foreign Application Priority Data

Oct. 15, 1998 (ZA) ...................................................... 98/9429

(51) Int. Cl.[7] .................................. C02F 3/32; C02F 3/00; C01G 49/00
(52) U.S. Cl. .......................... 210/602; 210/603; 210/610; 210/631; 210/912; 435/262.5; 423/140; 423/153; 423/DIG. 1; 423/DIG. 17
(58) Field of Search ..................................... 210/602, 603, 210/610, 631, 712, 713, 718, 719, 912; 435/262, 262.5; 423/140, 153, 511, 563, DIG. 1, DIG. 17

(56) References Cited

U.S. PATENT DOCUMENTS

| | | | |
|---|---|---|---|
| 4,839,052 | * | 6/1989 | Maree . |
| 5,316,751 | * | 5/1994 | Kingsley et al. . |
| 5,587,079 | * | 12/1996 | Rowley et al. . |
| 5,616,241 | * | 4/1997 | Khudenko . |
| 5,738,789 | * | 4/1998 | Shugina . |

* cited by examiner

*Primary Examiner*—David A. Simmons
*Assistant Examiner*—Fred Prince
(74) *Attorney, Agent, or Firm*—James Ray & Associates

(57) ABSTRACT

A process for treating sulphate- and metal-containing waste water, includes subjecting, in a reaction stage, the sulphate- and metal-containing waste water to biological sulphate reduction in which sulphates in the waste water are converted to sulphides, with metals present in the waste water precipitating out and treated waste water being obtained. The precipitated metals are withdrawn from the reaction stage, while treated waste water is withdrawn from the reaction stage. The treated waste water is subjected to polishing and/or to nutrient removal.

18 Claims, 2 Drawing Sheets

TREATMENT OF SULPHATE- AND METAL-CONTAINING WATER

Figure 1:
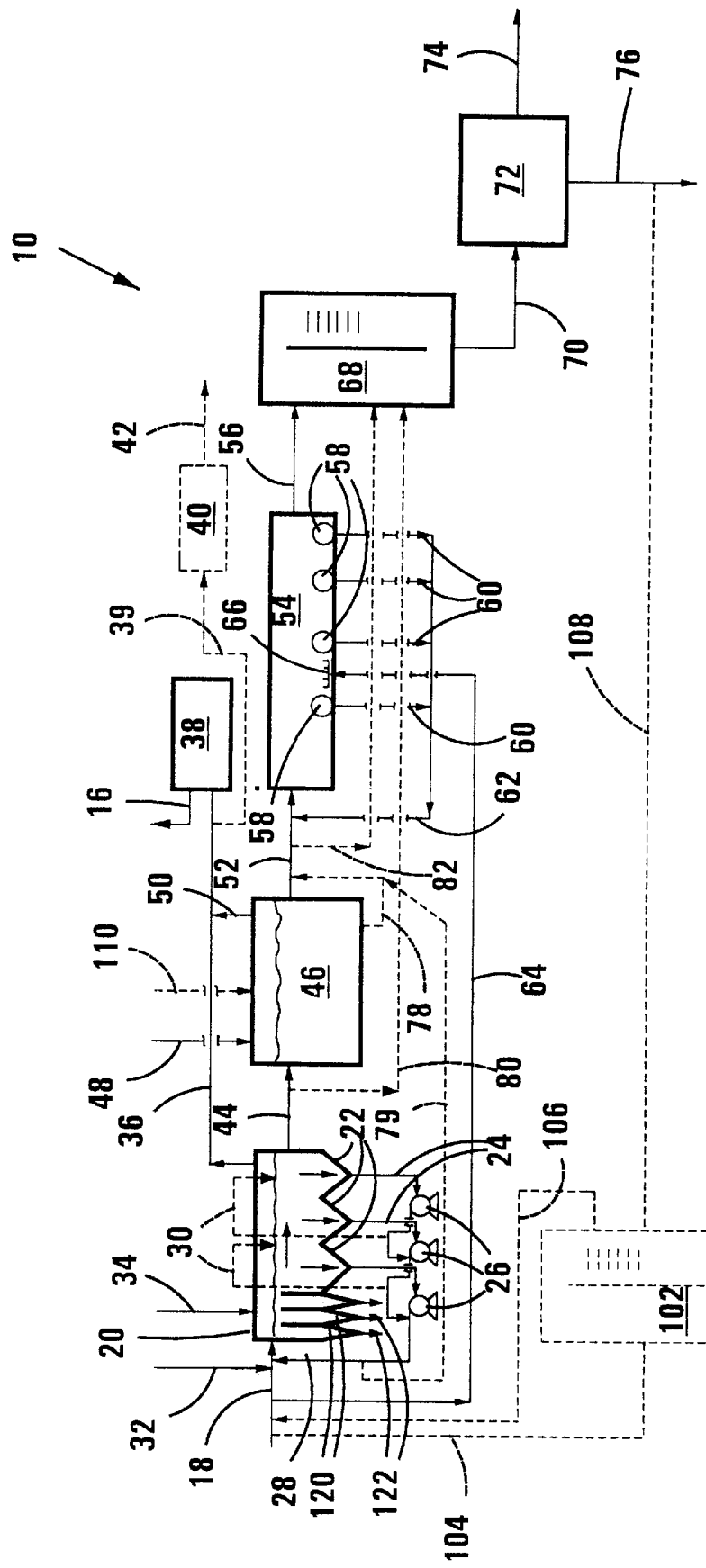

This invention relates to the treatment of water. More particularly, the invention relates to the treatment of waste water. Still more particularly, the invention relates to a process for treating sulphate- and metal-containing waste water.

According to the invention, there is provided a process for treating sulphate- and metal-containing waste water, which process includes subjecting, in a reaction stage, the sulphate- and metal-containing waste water to biological sulphate reduction in which sulphates in the waste water are converted to sulphides, with metals present in the waste water precipitating out and treated waste water being obtained;

withdrawing the precipitated metals from the reaction stage;

withdrawing treated waste water from the reaction stage; and subjecting the treated waste water to polishing and/or to nutrient removal.

The sulphate- and metal-containing waste water may be mine effluent or waste water containing dissolved heavy metal cations, such as ferrous cations, and dissolved sulphate anions. Instead, however, the waste water can be any other dissolved sulphate- and metal-containing waste water. These waste waters are also normally acidic.

The process may include adding metabolizable carbon to the sulphate- and metal-containing waste water in and/or before the reaction stage, for metabolization by the organisms involved in the biological sulphate reduction. The metabolizable carbon source may comprise an organic carbon source which exhibits a high chemical oxygen demand ('COD'), and may be water having organic material dissolved, suspended and/or carried therein. In one embodiment of the invention, the water may be an effluent or waste product. The effluent or waste product may be sewage, such as primary sewage sludge and/or secondary sewage sludge; settled sewage; settled sewage solids; tannery waste water; brewery waste water; starch manufacture waste water; winery waste water; and/or paper pulp waste water. In another embodiment of the invention, the water may have the organic source suspended therein, such as fine lignocellulosic material suspended in water. These waters all provide metabolizable organic carbon and the necessary organisms for biological sulphate reduction in the reaction stage.

The reaction stage may, in particular, comprise an accelerated hydrolysis reactor, with the sulphate- and metal-containing waste water entering the reactor at or near an inlet end thereof and the treated waste water being withdrawn at or near an outlet end thereof. As the sulphate- and metal-containing waste water, containing the metabolizable carbon source admixed therewith, flows along the reactor from its inlet end near the inlet end of the reactor, with hydrolysis of the solids component thereof into non-digestible or refractory COD material, hereinafter also referred to as 'RefCOD material'; slowly biodegradable COD material, hereinafter also referred to as 'SBCOD material', and readily biodegradable COD material, hereinafter also referred to as 'RBCOD material ', also taking place in the reactor, mainly downstream of the metal precipitation. At least some of the RefCOD and SBCOD material has a larger particle size than the RBCOD material, which has a particle size which is typically of the order of bout 0.1 $\mu$m or smaller. Typically, the RefCOD and SBCOD materials have particle sizes in the range 60 to 1000 microns. At least some of the RefCOD and SBCOD material thus settles to the bottom of the reactor as the waste water passes along the reactor, while at least some of the RBCOD material is withdrawn from the reactor with the treated waste water. Typically, substantially all of the RefCOD and SBCOD material settles, while substantially all of the RBCOD material is withdrawn with the treated waste water.

The accelerated hydrolysis reactor may thus comprise a precipitation section at or near its inlet end and a subsequent hydrolysis section. The reactor may include, at or in a bottom or base thereof and in the precipitation section, at least one primary valley or trough in which the precipitated metals collect, and, at or in a bottom or base thereof and in the hydrolysis section, at least one secondary valley or trough. The primary and secondary troughs or valleys thus extend transversely to the direction of water flow through the reactor. A plurality, eg three, of the primary troughs or valleys, located adjacent one another, may be provided. Likewise, a plurality of the secondary troughs or valleys, located adjacent one another, may be provided.

Thus, the precipitated metals which collect in the primary valleys or troughs will be withdrawn, eg by means of pumps, in the form of a slurry.

The settled material in the secondary troughs or valleys can be recycled to the reactor, preferably with shearing thereof, eg by means of a high shear pump. In this fashion, in addition to the hydrolysis, fractionation of the RefCOD and SBCOD material, into RBCOD material, occurs.

Typically, the accelerated hydrolysis reactor may comprise three of the secondary valleys. The settled material from each of the secondary valleys may be recycled to the inlet end of the reactor. Instead, however, the settled material of the second and third secondary valleys can be recycled to the reactor downstream of its inlet end, eg to above the second and third secondary valleys respectively.

The process may include removing sulphides from the accelerated hydrolysis reactor. At least some of sulphides which form during the biological sulphate reduction are in the form of gaseous hydrogen sulphide, which collects in a head space of the reactor. The removal of the hydrogen sulphide may then include purging this head space with an inert gas, such as nitrogen, and withdrawing a combined hydrogen sulphide/inert gas stream from the reactor head space. Hydrogen sulphide can then be recovered from this gaseous stream. The recovered hydrogen sulphide can then typically be used as the sulphide required for precipitation of metals from the raw waste water. Instead, if desired, the gas stream can be subjected to sulphide oxidation, thereby to obtain sulphur as a product.

While the waste water from the accelerated hydrolysis reactor, and which contains the RBCOD material, can pass directly to a polishing stage in which the polishing and/or nutrient removal is effected, it may instead pass through a further reactor where it is subjected to further biological sulphate reduction, ie further biological conversion of sulphates to sulphides. Further setting of solid material can also take place in this reactor. This reactor may also be subjected to hydrogen sulphide removal, eg by means of a nitrogen or other inert gas purge, as hereinbefore described for the accelerated hydrolysis reaction. The further reactor may comprise a baffle reactor, a UASB reactor, an expanded bed granular reactor, a stirred reactor, or the like.

The waste water from the further reactor can then, if desired, pass through an elongated trench reactor, before passing to the polishing stage. It will be appreciated that the waste water from the accelerated hydrolysis reactor can, instead of passing to the further reactor as hereinbefore described, pass directly to the trench reactor. In the trench reactor, any residual settleable material can settle out, and biological sulphate reduction can be effected therein, if necessary.

The elongated trench reactor typically has a depth of 2–6 m, a width of 10–30 m, and a length of up to one or more kilometers, eg 1–4 m. The waste water enters one end of the trench reactor, passes along the trench reactor, and is withdrawn at its other end. A series of pumps may be associated with the trench, with the pumps being spaced apart along its length. Each pump may be arranged to recycle waste water and sediment from the bottom of the trench reactor in an upstream direction relative to the flow of waste water along the reactor. This will keep the bacterial population in the reactor in continuous movement. Thus, each pump is associated with a flow lone along which it pumps waste water and sediment, the flow line having an inlet from the trench reactor and an outlet which is upstream of the inlet. All the outlets may be located in proximity to the waste water inlet end of the trench reactor. The trench reactor may thus be as described in ZA 97/4165, which is hence incorporated herein by reference, or a modification thereof. For example, when the trench reactor is in accordance with that described in ZA 97/4165, ie having a membrane extending along its length and across its width at a level below the tops of its side walls, the membrane dividing the trench into a lower sulphate reduction chamber below the membrane and in which the flow line inlets are located, and an upper waste water polishing chamber above the membrane, with the chambers being hydraulic communication along the length of the trench at opposite side edges of the membrane, the polishing stage may thus be provided by the upper chamber above the membrane.

However, in a modification of the trench reactor of ZA 97/4165, the process may include feeding sulphate-containing waste water through at least one diffuser located at or near the bottom of the reactor, thereby to keep the sediment in the bottom of reactor in a stage of expansion. The sulphate-containing waste water may be a slipstream of the waste water which enters the accelerated hydrolysis reactor.

The polishing stage may comprise a high rate algal pond. Instead any other apparatus suitable for polishing, ie removal of residual COD and other components, and/or nutrient removal, ie removal of nitrates and phosphates, can be used.

The process may include passing the waste water from the polishing stage to a harvesting stage in which the biomass in the waste water is harvested.

The process may include, if desired, subjecting at least a portion of the sulphate- and metal-containing waste water to biologically derived alkalization to increase its pH, prior to the sulphate- and metal-containing water passing into the accelerated hydrolysis reactor. The alkalization may be effected tin a stress reactor, which may comprise a high rate algal pond. If desired, at least a portion of the biomass harvested in the harvesting stage may be fed into the stress reactor to provide the necessary algal biomass for alkalization to take place therein.

If desired, the waste water from the or the final reactor may be subjected to settling, in a further settling stage, to remove further metal sulphides which are present therein, with these metal sulphides then, together with the metal sulphides form the initial settler, being subjected to reduction to recover ferric cations and sulphur, which can be withdrawn as a product, and with the ferric cations being recycled to the waste water between the or the final reactor and the further settler.

Figure 2:
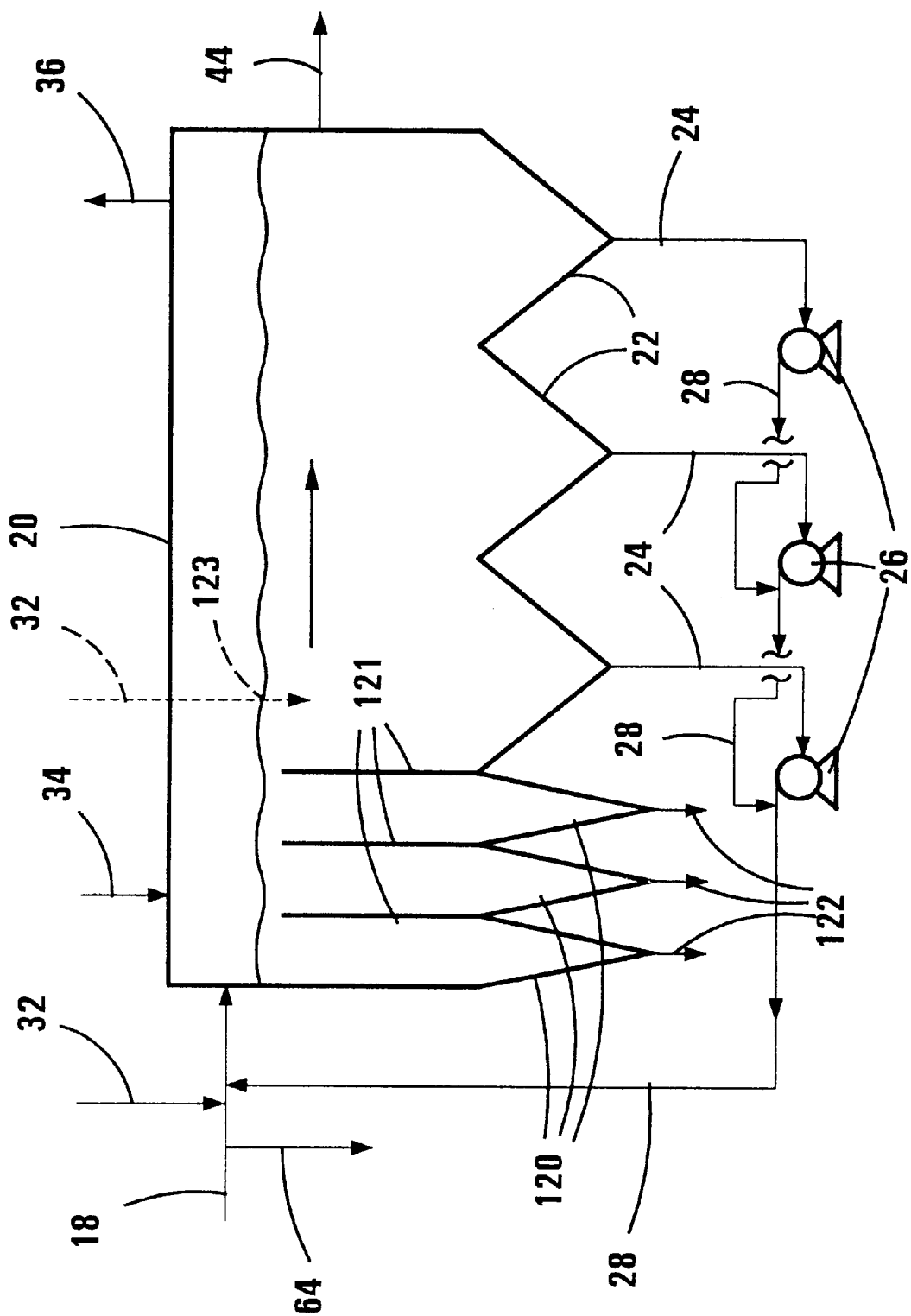

The invention will now be described in more detail with reference to the accompanying diagrammatic drawings, in which FIG. 1 shows a process according to the invention for treating waste water; and FIG. 2 shows, on an enlarged scale, the reactor of FIG.

In the drawings, reference numeral 10 generally indicates a process for treating waste water.

The process 10 comprises an accelerated hydrolysis reactor 20, with a waste water feed line 18 leading into an inlet end of the reactor, while a treated waste water withdrawal line 44 leads from an outlet end of the reactor.

The hydrolysis reactor 20 comprises, at its bottom and in a metal precipitation section adjacent it its inlet end, three staggered primary valleys or troughs 120. The primary valleys 120 extend transversely to the direction of liquid flow through the reactor, and precipitated metal withdrawal lines 122 lead from their apices. A greater or lesser number of primary valleys 120 can be provided, if desired. The primary valleys 120 have walls 121 which extend upwardly to close to the normal liquid level 123 in the reactor 20.

The reactor 20 also comprises, at its bottom and in a hydrolysis section downstream of the precipitated section, three secondary valleys 22 which are staggered in the direction of water flow through the reactor. However, a greater or lesser number of secondary valleys 22 can be provided, if desired. A sediment withdrawal line 24 leads from each valley 22 to a high shear pump 26, with a discharge line 28 leading from each pump 26 to the flow line 18. Instead, however, the pumps 26 associated with the second and third valleys can have discharge lines 30, indicated in broken line, leading back into the reactor 20 above or ahead of the respective valleys.

The primary valleys 120 are narrower, at their inlets, than the secondary valleys 20, and are also deeper than the secondary valleys, as indicated schematically in FIGS. 1 and 2.

A sewage addition line 32 leads into the waste water line 18 ahead of the reactor 20. Instead, or additionally, the addition line 32 can lead directly into the reactor 20 downstream of the valleys 120, as indicated in broken line in FIG. 2. Thus, in use, sewage can be added upstream of the reactor and/or directly to the reactor.

A nitrogen addition line 34 leads into the top of the reactor 20, with a gaseous steam withdrawal line 36 leading from the top of the reactor to a separation stage 38. A hydrogen sulphide line 16 leads from the stage 38. However, if desired, instead of the stage 38, a sulphide oxidation stage 40 can be provided, with a gaseous stream line 39 then leading from the line 36 into the stage 40, and sulphur withdrawal line 42 then leading from the sulphur oxidation stage 40.

The waste water withdrawal line 44 leads from the reactor 20 to a further reactor 46 which may be in the form of a baffle reactor, a UASB reactor, an expanded bed granular reactor or a stirred tank. A nitrogen addition line 48 also leads to the top of the reactor 46, with a gaseous stream withdrawal line 50 leading from the reactor 46 into the line 36.

A waste water line 52 leads from the reactor 46 to an elongate trench reactor 54. The line 52 thus leads into one end of the trench 54, while a waste water line 56 leads from the other end of the trench 54. Along its length, the trench 54 is provided with a plurality of sludge or sediment withdrawal pipes 58, from each of which leads a conduit 60. The conduits 60 lead into a return conduit 62 leading into the waste water conduit 52 upstream of the rector 54. It will be appreciated that one or more of the conduits 60, and/or the conduits 62, may be provided with a suitable pump.

A flow line 64 leads from the flow line 18 to at least one distributor or diffuser 66 provided in the bottom of the reactor 54. In use, water entering through the distributor 66 will serve to expand the sludge which collects at the bottom of the reactor 54 and provide additional sulphate.

The line 56 leads to a high rate algal pond 68, with a line 70 leading from the pond 68 to a harvesting stage 72. A water withdrawal line 74 leads from the harvesting stage 72, as does a biomass withdrawal line 76.

An optional sludge transfer line 78 leads from the bottom of the reactor 46, into the flow line 52, as does an optional sediment transfer line 79 which leads from the valleys 22 of the reactor 20.

In one embodiment of the invention, the reactors 46, 54 can be dispensed with. A flow line 80 will then lead directly from the flow line 44 to the high rate algal pond 68.

In another embodiment of the invention, the reactor 46 may be present; however, the reactor 54 can then be dispensed with. A flow line 82 will then lead directly from the flow line 52 to the high rate algal pond 68.

In yet another embodiment of the invention, the reactor 46 can be dispensed with. The flow lines 44, 58 will then lead directly into the reactor 54.

The process 10 may also optionally include an alkalization stage 102. When the stage 102 is present, a waste water flow line 104 will then lead from the waste water line 18 to the stage 102, with a waste water return line 106 leading from the stage 102 back to the flow line 18. The stage 102 may then comprise a stress reactor, typically a high rate algal pond. A biomass addition line 108 may then lead from the biomass recovery line 76 to the stage 102.

In use, acidic mine water containing dissolved sulphate anions and ferrous cations passes along the flow line 18 into the accelerated hydrolysis reactor 20. Sewage is added to the waste water along the line 32. The sewage thus provides a metabolizable carbon source. In the reactor 20, the waste water moves horizontally from one end of the reactor to the other, while flocs of precipitated metals settle into the valleys 120 and are withdrawn along the lines 122. Flocs of solid matter settle into the valleys 22. The solids comprise RefCOD material, SBCOD material and RBCOD material. The RBCOD material is approximately 0.1 µm in size, and exits the reactor 20 with the waste water, along the line 44.

The RefCOD and SBCOD material settles into the valleys 22, is withdrawn along the lines 24, passes through the high shear pumps 26 and is recycled by means of the lines 28 to the reactor 20. Thus, in the reactor 20, there is hydrolysis of the solid and floc material into RefCOD, SBCOD and RBCOD material, together with fractionation of the RefCOD and SBCOD material into RBCOD material. Additionally, sulphate reduction is effected in the reactor 20.

A nitrogen purge enters the top of the reactor 20 along the line 34 and purges hydrogen sulphide which collects in the head space of the reactor 20. A gaseous stream comprising nitrogen and hydrogen sulphide passes along the line 36 to the hydrogen sulphide recovery stage 38, with the hydrogen sulphide which is thus recovered passing along the line 16. As indicated hereinbefore, the stage 38 can be omitted, if desired. The nitrogen/hydrogen sulphide gas stream from the reactor 20 will then pass along the flow line 39 into a sulphide oxidation stage 40, with sulphur being recovered from the stage 40 along the flow line 42.

The RBCOD-containing waste water from the stage 20 passes along the flow line 44 into the reactor 46. Nitrogen also enters the head space of the reactor 46 along the flow line 48, with a hydrogen sulphide/nitrogen gaseous mixture being withdrawn from the reactor 46 along the flow line 50 which leads into the flow line 36.

In the reactor 46, further biological reduction of sulphates takes place. The reactor 46 also acts as a settler for settleable material, some of which can optionally be withdrawn from the bottom of the reactor along the line 78 and added back to the waste water withdrawn from the reactor 46 along the line 52. Some of the sludge from the accelerated hydrolysis reactor 20 can also be fed to the trench reactor 54, along the flow line 79, if desired.

The waste water passing along the line 52 contains substantially no iron and no sulphates. It can, however, contain undigested particulates.

The waste water from the reactor 46 passes into the trench reactor 54 which permits any residual settleables to settle out in the bottom of the reactor. The material is withdrawn through the conduits 58, 60 and recycled along the conduit 62. The sludge in the reactor 54 is kept in the state of expansion by means of sulphide-containing waste water which enters the bottom of the reactor through the distributor 66.

Further sulphate reduction, if there are still sulphates present in the water entering the reactor 54, can take place in the reactor 54.

Waste water from the trench reactor 54 passes along the flow line 56, into the high rate algal pond 68, where final polishing of the waste water, ie nitrate and phosphate removal therefrom, takes place. The polished water is withdrawn from the high rate algal pond 68 along the flow line 70, to the harvesting stage 72. Treated waste water is withdrawn from the harvesting stage 72 along the flow line 74, and biomass, which can be used for aqua culture, being withdrawn along the line 76.

When the optional alkalization stage 102 is provided, then at least a portion of the waste water from the settler 12 passes, along the flow line 104, to the stage 102, with waste water, having higher alkalinity, being returned along the line 106. Algal biomass in the stage 102, which is required for alkalization of the waste water, is augmented by biomass from the stage 72, which is fed into the stage 102 along the line 108.

Thus, the products from the process 10 are sulphur, biomass which can be used for aquaculture, and treated waste water. Additionally, ferric cations can also be produced. Still further, the process 10 results in the disposal of a waste product, ie sewage.

What is claimed is:

1. A process for treating sulphate- and metal-containing waste water, which process includes passing sulphate- and metal-containing waste water into an accelerated hydrolysis reactor having an inlet end and an outlet end, with the sulphate- and metal-containing waste water entering the reactor at or near the inlet end thereof and flowing along the reactor from its inlet end towards its outlet end, adding metabolizable carbon to the sulphate- and metal-containing waste water in and/or before the accelerated hydrolysis reactor, for metabolization by the organism involved in the biological sulphate reduction;

subjecting, in the reactor, the sulphate- and metal-containing waste water to biological sulphate reduction in which sulphates in the waste water are converted to sulphides, with metals present in the waste water precipitating out in a precipitation section near the inlet end of the reactor, with treated waste water being obtained and wherein, as the sulphate- and metal-containing waste water, containing the metabolizable carbon source admixed therewith, flows along the reactor, hydrolysis of the solids component thereof into non-digestible or refractory COD material, hereinafter also referred to as 'RefCOD material'; slowly biodegradable COD material, hereinafter also referred to as 'SBCOD material', and readily biodegradable COD material, hereinafter also referred to as 'RBCOD material', also takes place in the reactor, mainly downstream of the metal precipitation, in a hydrolysis section, with at least some of the RefCOD and SBCOD material having a larger particle size than the RBCOD material, so that at least some of the RefCOD and SBCOD material settles to the bottom of the reactor as the waste water passes along the reactor;

withdrawing the precipitated metals from the reactor;

withdrawing treated waste water together with at least some of the RBCOD material from the reactor, at or near the outlet end thereof; and subjecting the treated waste water to polishing and/or to nutrient removal.

2. A process according to claim 1, wherein the sulphate- and metal-containing waste water is acidic mine effluent or waste water containing dissolved heavy metal cations and dissolved sulphate anions.

3. A process according to claim 1, wherein the metabolizable carbon is provided by an effluent or waste product comprising organic material dissolved, suspended and/or carried in waste water, with the effluent or waste product being selected from sewage, settled sewage, settled sewage solids, tannery waste water, brewery waste water, starch manufacture waste water, winery waste water and paper pulp waste water, which all provide metabolizable organic carbon and the necessary organisms for biological sulphate reduction in the reaction stage.

4. A process according to claim 1, wherein the metabolizable carbon is provided by water having fine lignocellulosic material suspended therein, with such water providing metabolizable organic carbon and the necessary organisms for biologized sulphate reduction in the reaction stage.

5. A process according to claim 1, wherein the reactor includes, at or in a bottom or base thereof and in the precipitation section, at least one primary valley or trough in which the precipitated metals collect, and, at or in a bottom or base thereof and in the hydrolysis section, at least one secondary valley or trough, and with the primary and secondary troughs or valleys extending transversely to the direction of water flow through the reactor.

6. A process according to claim 5, wherein the precipitated metals which collect in the primary valley or trough are withdrawn in the form of a slurry, while the settled material in the secondary trough or valley is recycled, with shearing, to the reactor, so that, in addition to the hydrolysis, fractionation of the RefCOD and SBCOD material, into RBCOD material, occurs.

7. A process according to claim 6, wherein the accelerated hydrolysis reactor includes three of the secondary valleys, with the settled material from each of the secondary valleys being recycled to the inlet end of the reactor.

8. A process according to claim 1, which includes removing the sulphides that are formed, from the accelerated hydrolysis reactor.

9. A process according to claim 8, wherein at least some of the sulphides which form during the biological sulphate reduction are in the form of gaseous hydrogen sulphide, which collects in a head space of the reactor, with the removal of the hydrogen sulphide including purging this head space with an inert gas, and withdrawing a combined hydrogen sulphide/inert gas stream from the reactor head space.

10. A process according to claim 1, wherein the treated waste water from the accelerated hydrolysis reactor, and which contains RBCOD material, passes through a further reactor where it is subjected to further biological sulphate reduction for further biological conversion of sulphates to sulphides, before being subjected to the polishing and/or nutrient removal in a polishing stage.

11. A process according to claim 10, wherein the treated waste water from the further reactor passes through an elongated trench reactor, before passing to the polishing stage, with settling out of any residual settleable material and further biological sulphate reduction, if necessary, being effected in the trench reactor.

12. A process according to claim 11, wherein the treated waste water enters one end of the trench reactor, passes along the trench reactor, and is withdrawn at its other end, and with a series of pumps being associated with the trench reactor, the pumps being spaced apart along its length, and each pump being arranged to recycle waste water and sediment from the bottom of the trench reactor in an upstream direction relative to the flow of waste water along the trench reactor so as to keep the bacterial population in the trench reactor in continuous movement, with each pump being associated with a flow line along which it pumps waste water and sediment, which flow line has an inlet from the trench reactor and an outlet which is upstream of the inlet.

13. A process according to claim 12, wherein the trench reactor has a membrane extending along its length and across its width at a level below the tops of its side walls, the membrane dividing the trench into a lower sulphate reduction chamber below the membrane and in which the flow line inlets are located, and an upper waste water polishing chamber above the membrane, with the chambers being in hydraulic communication along the length of the trench at opposite side edges of the membrane, and with the polishing stage being provided by the upper chamber above the membrane.

14. A process according to claim 12, which includes feeding sulphate-containing waste water through at least one diffuser located at or near the bottom of the trench reactor, thereby to keep the sediment in the bottom of reactor in a stage of expansion.

15. A process according to claim 10, wherein the polishing stage comprises a high rate algal pond.

16. A process according to claim 10, which includes passing the waste water from the polishing stage to a harvesting stage in which the biomass in the waste water is harvested.

17. A process according to claim 16, which includes subjecting at least a portion of the sulphate- and metal-containing waste water to biologically derived alkalization to increase its pH, prior to the sulphate- and metal-containing waste water passing into the accelerated hydrolysis reactor.

18. A process according to claim 17, wherein the alkalization is effected in a stress reactor, with at least a portion of the biomass harvested in the harvesting stage being fed into the stress reactor to provide the necessary algal biomass for alkalization to take place therein.

* * * * *